April 18, 1961     O. NIELSEN ET AL     2,980,377
TREE STAND
Filed Feb. 5, 1958
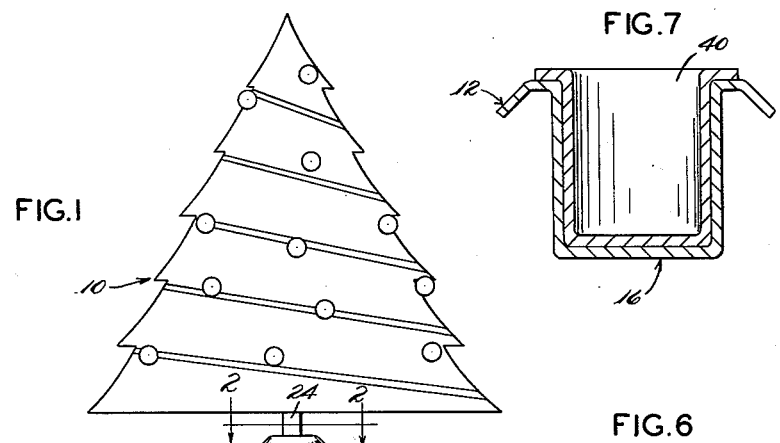
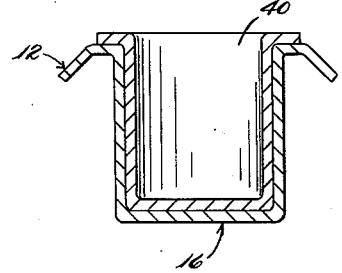
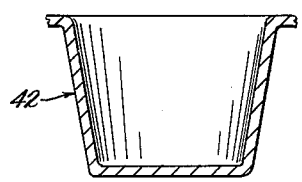
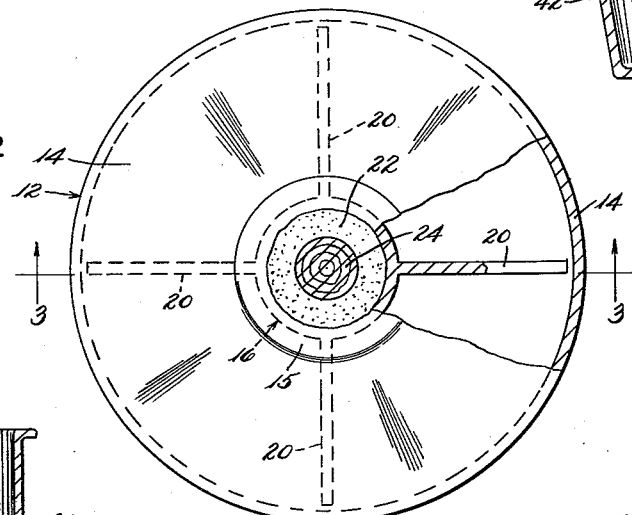
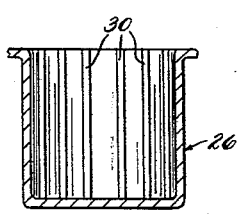
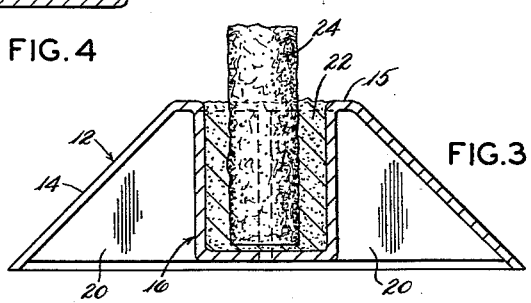
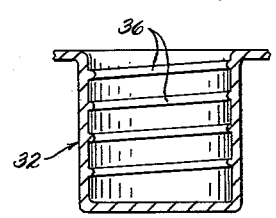
INVENTORS
OLAF NIELSEN
JOSEPH V. VIOLA
RAYMOND KENT

2,980,377
TREE STAND

Olaf Nielsen, 1016 Emma Ave., Akron, Ohio; Joseph Virgil Viola, 1429 Marcy St., Akron, Ohio; and Raymond Kent, Akron, Ohio (905 Norton Drive, Tallmadge, Ohio); Dorothy Jane Viola, executrix of said Joseph Virgil Viola, deceased Filed Feb. 5, 1958, Ser. No. 713,351

5 Claims. (Cl. 248—44)

This invention is directed to improvements in supports for cut trees and the like.

Present bases ar mostly characterized by mechanical tightening means, such as clamps, spaced screws, collars, pins, fingers and the like, designed to hold a cut tree in upright position on the floor. A long-standing problem has been to provide a base which would be secure and which would need a minimum of adjustment, both to compensate for the thickness of the tree-trunk, and to take into account any curvature of the trunk near its lower end. In most cases, the resultant bases are complicated, multi-piece devices necessitating the use of tools for finally tightening the base securely onto the end of the tree-trunk; it often becomes necessary to upend the entire unit in order to make final adjustments. Some prior devices even require the efforts of more than one person.

The object of the present invention is therefore to provide a light-weight, yet sturdy, support for an upright member.

A further object is to provide inexpensive means for supporting an upright member in a substantially vertical attitude, and for securing such member in a base without the use of screws, clamps, and the like.

Another object of the invention is to provide a base wherein a tree trunk is supported about its entire circumference.

Yet another object of the invention is to provide a simple stand in which a tree may be affixed without tools in a minimum amount of time, without the need for further adjustment or leveling.

These and further objects and advantages of the invention will be apparent from the following description and drawings in which:

Figure 1 is a side elevation of a tree with its trunk affixed in the base of the invention;

Figure 2 is an enlarged sectional view, taken along line 2—2 of Figure 1;

Figure 3 is a sectional view of the base taken along line 3—3 of Figure 2;

Figure 4 is a sectional view showing a modification of the invention;

Figure 5 is a sectional view showing another modification of the invention;

Figure 6 is a sectional view showing yet another modification of the invention.

Figure 7 is a sectional view showing yet another modification of the invention.

Reference is now made to the drawings, wherein the numeral 10 denotes a tree shown supported in a base 12.

The base 12 of the invention is shown in conjunction with the lower end of a tree trunk 24, which it supports. The end of the tree trunk 24 is shown in place in a cup 16 integrally connected with and supported by a wall 14 of base 12. Base 12 is substantially frusto-conical in shape, with cup 16 suspended from the upper rim 15 of base 12, and extending axially downwardly within the base, but terminating short of the base line of the said base. The cup may be braced against excessive downward axial movement toward the base line, and against lateral displacement, by the provision of stiffening ribs 20. The space between the end of the tree trunk 24 and the wall of the cup is occupied by a quick-hardening, originally-flowable material 22, the composition of which is not the subject of this invention. Suffice it to say that it must have high compression strength in the hardened state. Applicants have found materials such as certain types of quick-hardening plasters and certain plastic compounds to be eminently suitable to the purpose.

Where desired, the inner surface of the cup may be provided with longitudinally extending irregularities 30 for imparting greater rigidity to the structure, and to provide greater tie-in between the material and the inner surface of the cup 26, as shown in Figure 4.

Another way of providing rigidity and tie-in is by means of helical threads or ribs 36, Fig. 5, extending from the wall of cup 32. In the latter case, the tree-trunk and its associated hardened compound block are removed from the cup by twisting the base from the tree.

The cup may also be tapered, as shown at 42, in Figure 6, in which case less axial force will be necessary to remove the trunk and its compound block from the base.

Further, the cup may be a separable member 40 inserted in cup 16, as shown in Fig. 7, whereby after use, the tree-trunk 24, along with its associated hardened material and the cup 40, may be disposed of. When using a separable member 40, the inner wall thereof may be provided with irregularities such as, for example, threads or ribs similar to those shown at 30 in Figure 4 or at 36 in Figure 5. In this manner, improved rigidity of the structure and increased tie-in between the material 22 and the inner cup surface is again provided.

To use the support described, the base is first placed on a level surface; an amount of the compound sufficient to substantially fill the cup when the end of the tree-trunk is inserted therein is poured into the cup. The tree-end is inserted in the cup, and the tree is maintained in the desired upright position for a length of time sufficient to allow the compound to settle closely about the circumference of the tree-end and against the walls of the cup and harden. At this time, the tree has become permanently affixed in the stand in the desired attitude, and needs no further adjustments.

Thus, even though the tree trunk be so irregular in surface configuration as to defy mechanical clamping means, the compound will flow into and around every irregularity in the trunk surface and form a connecting solid between the trunk and the cup as it hardens. In the case of a tree which has a substantial curvature near its end, mechanical clamps quite often do not have a sufficiently wide range of adjustment to properly engage the trunk. The cup of the present invention is sufficiently large to accommodate trunks of varying curvature, and material 22 will easily fill the space between the trunk and the cup.

When it is desired to separate the tree from the stand, the tree trunk and the associated block of hardened compound 22 are simply pulled from cup 16, and the base is ready for reuse. Where a separable cup member is used, separation from the base consists of removing as a unit the separable cup, the compound and the trunk end; a replacement separable cup is thereafter used for the next application.

It will be understood that numerous other alterations and modifications may occur to those skilled in the art, without departing from the scope of the invention, the novel features of which are defined in the appended claims.

What is claimed is:

1. The combination of a tree having a trunk-end and a stand therefor, said stand comprising a base having an integral cup member, a separable cup member engaging the inner surface of said integral cup member and receiving said trunk-end, and an initially flowable, thereafter quick-hardening, material between the inner surface of said separable member and said trunk-end, whereby upon hardening of said material said trunk-end is rigidly supported in said base, while being removable from said base with said separable member.

2. The combination of claim 1, wherein the inner surface of said separable member is provided with ribs.

3. The combination of claim 1, wherein the inner surface of said separable member is provided with helical threads.

4. The combination of claim 1, wherein the inner surface of said separable member is provided with longitudinal splines.

5. The combination of a support and a supported member, said support comprising a first integral cup, a second separable cup engaging the inner surface of said first integral cup, and initially flowable, thereafter quick-hardening means in said second separable cup rigidly supporting said member in said second separable cup.

References Cited in the file of this patent

UNITED STATES PATENTS

| | | |
|---|---|---|
| 105,061 | French | July 5, 1870 |
| 497,999 | Windus | May 23, 1893 |
| 827,199 | White | July 31, 1906 |
| 1,287,069 | Martin | Dec. 10, 1918 |
| 1,914,150 | Mouldon | June 13, 1933 |
| 2,292,505 | Black | Aug. 11, 1942 |
| 2,492,152 | Hollowell | Dec. 27, 1949 |